Figure 1:
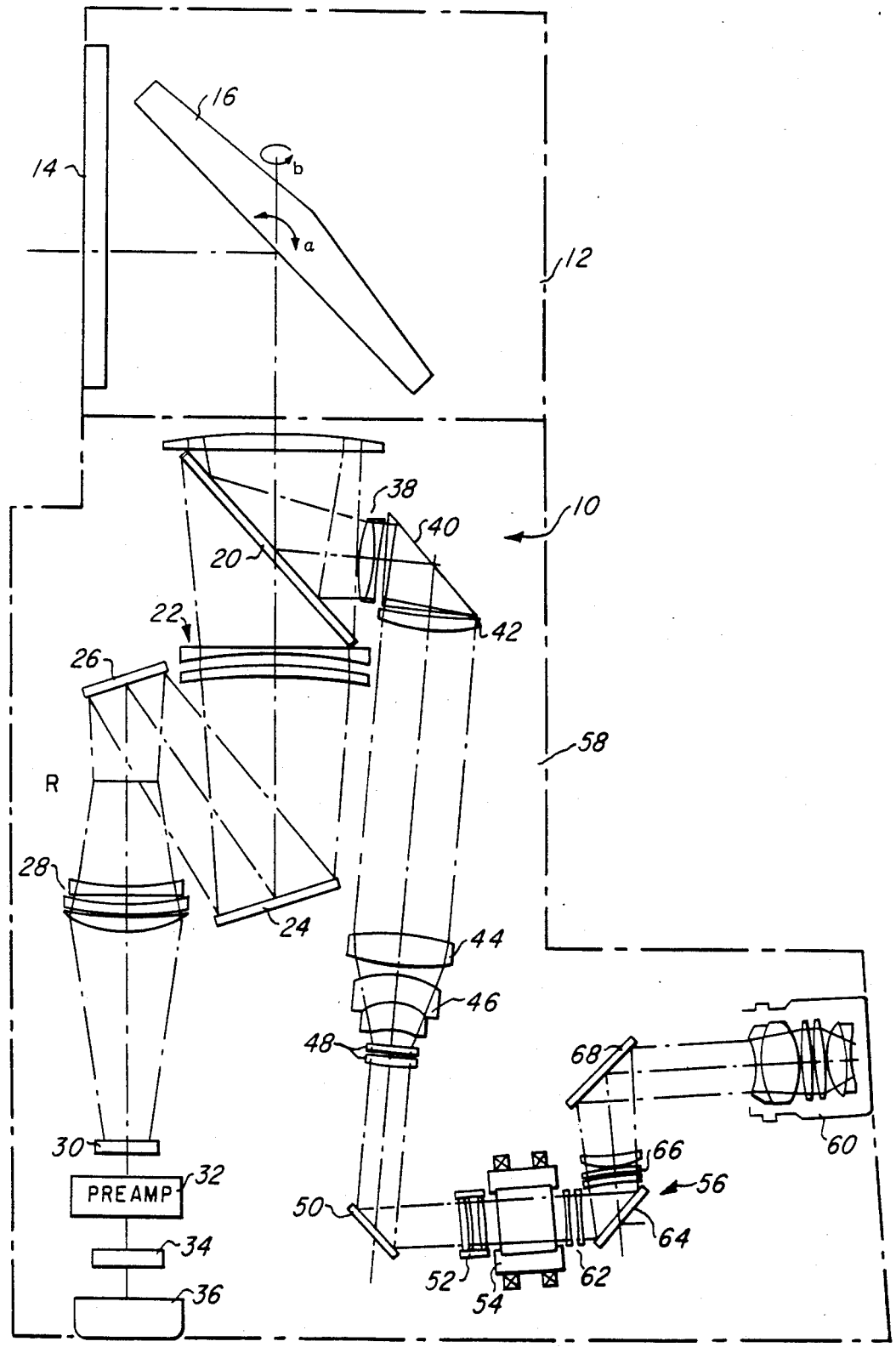
Figure 1:
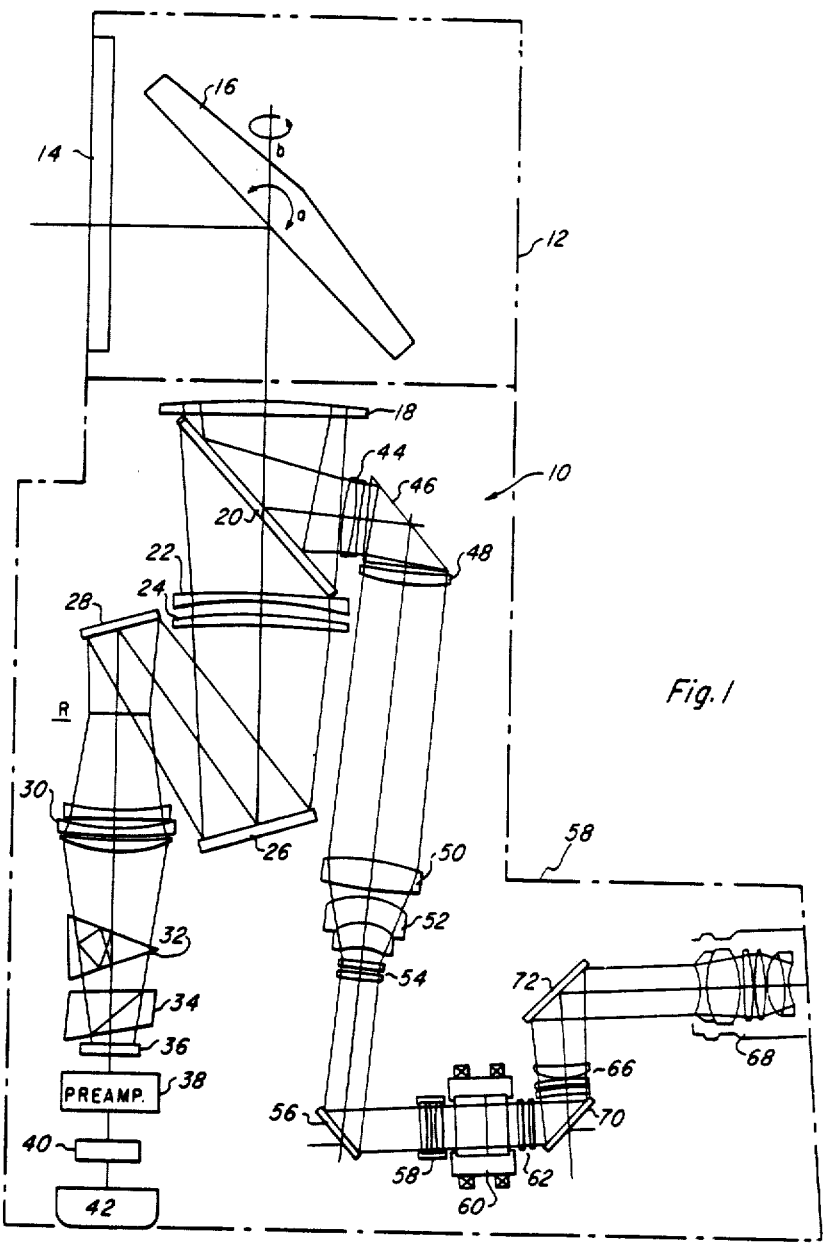

United States Patent [19]

Crossland et al.

[11] Patent Number: 4,621,888
[45] Date of Patent: Nov. 11, 1986

[54] COAXIAL WIDEBAND REFRACTIVE OPTICAL SYSTEM

[75] Inventors: Robert E. Crossland, Plano; Erwin E. Cooper, Carrollton, both of Tex.

[73] Assignee: Texas Instruments Incorporated, Dallas, Tex.

[21] Appl. No.: 473,891

[22] Filed: Mar. 10, 1983

[51] Int. Cl.$^4$ .............................................. G02B 13/14
[52] U.S. Cl. ...................... 350/1.2; 350/1.4; 350/541
[58] Field of Search ................ 350/1.2, 511, 541, 557, 350/173, 169, 538, 1.3, 1.4; 250/339, 342, 349

[56] References Cited

U.S. PATENT DOCUMENTS

| | | | |
|---|---|---|---|
| 4,038,547 | 7/1977 | Hoesterey | 350/1.3 |
| 4,074,930 | 2/1978 | Folsom et al. | 350/173 |
| 4,260,217 | 4/1961 | Traeger et al. | 350/538 |

Primary Examiner—Bruce Y. Arnold
Attorney, Agent, or Firm—Alva H. Bandy; James T. Comfort; Melvin Sharp

[57] ABSTRACT

A coaxial wideband refractive optical system is disclosed which permits the use of high resolution optical sensors and transmitters in the visible energy wavelengths centered at 0.5 microns to the 12 microns wavelength in the infrared energy band. The system includes a front objective lens of wideband transmitting material such as, for example, ZnS, ZnSe, GaAs, TI-1173 glass or Ge followed by a beamsplitter and two doublet lenses. The front objective lens, which may be a positive lens, can have large color dispersion characteristics (aberrations) not normally associated with front lenses. A front, solid wideband objective lens is provided for receiving incoming electromagnetic energy radiating at about 0.5 micron to about 12 microns wavelength in the infrared for reducing the size of the beam diameter; thus, the size of the beamsplitter and the elements of the infrared and visible optical paths formed by the beam splitter may be reduced. Each optical path formed by the beamsplitter includes one of the two lens doublets, each of which includes a negative lens of material like that of the front lens for correcting color aberrations and a positive lens which coacts with the remaining optical elements of the optical paths for correcting spherical aberrations introduced by the doublet's negative lens.

5 Claims, 1 Drawing Figure

COAXIAL WIDEBAND REFRACTIVE OPTICAL SYSTEM

This invention relates to optical systems and more particularly to coaxial wideband refractive optical systems for use with high resolution optical sensors and transmitters with very large differences in their spectral wavelength of operation.

In the past, spectral wavelength operation over a 20 to 1 ratio (10 micron wavelength for IR/0.5 micron wavelength for VISIBLE=20/1) in refractive optical systems has required lens switching-type systems, or side-by-side sensor systems, or aperture sharing systems.

Lens switching type systems require the use of additional manpower, or bulky expensive, mechanical or electromechanical lens switching mechanisms requiring the attention of the operator for lens selection. Side-by-side sensor systems require boresighting both of them on a common elevation or azimuth or both using optics such as a head mirror or prism. The resulting structure is large, complicated, and expensive to manufacture, repair and maintain. And, aperture sharing systems, up to the present invention, have increased substantially the system diameter which complicates stabilization of the system and adds to the size and cost of the system—especially in a panoramic periscope where 360 degrees of azimuth coverage is required and the torquers, resolvers, and slip-ring assemblies become large.

An example of an aperture sharing system with typical lens switching for covering wide chromatic bandwidths is the Panoramic Periscope of U.S. Pat. No. 4,260,217, issued Apr. 7, 1981 to Traeger et al. Traeger et al teach cutting a hole in the main infrared objective lens for transmission of visible light along the visible optic path. The hole creates diffraction problems in the infrared region and necessitates increased size of the objective lens to maintain an equivalent optical speed (f-number).

Accordingly, it is an object of the present invention to provide coaxial wideband refractive optical systems which permits the use of high resolution optical sensors and transmitters with very large differences in their spectral wavelength of operation.

Another object of the invention is to provide a coaxial wideband refractive optical system which provides multifunction design considerations and is free of diffraction losses due to obscurations, complicated lens switching mechanisms, boresight retention problems and veiling glare problems.

A further object of the invention is to provide a coaxial wideband refractive optical system which is compact, inexpensive, and which lends itself to mass production techniques.

Still another object of the invention is to provide a coaxial wideband refractive optical system through which a wide range of electro-optical sensors can be processed through the same optical system.

Yet another object of this invention is to provide a coaxial wideband refractive optical system which lends itself to panoramic gimbal operation.

Briefly stated, the coaxial wideband refractive optical system comprises a means of using a highly dispersive objective lens of wideband transmitting material in a unique design configuration which provides high performance optical resolution from the visible spectrum with improved visible light transmission to about twelve microns in the infrared.

Other objects and features of the invention will become more readily understood in the following detailed description taken in conjunction with the drawings.

The figure (FIG. 1) is a section of the invention included in a periscope showing the single optical system for visible viewing and IR imaging.

Referring now to FIG. 1, the coaxial wideband refractive optical system 10 when incorporated in a periscope has a housing 12 having a window 14 which is transparent at least from the visible through about the twelve micron spectral range or spectral region desired. The window 14 may be, for example, a zinc sulfide window. A reflector mirror 16 is movably mounted in housing 12 and forms an optical path from the window 14 to the optical system 10. The mirror 16 is adjustable in elevation and azimuth as indicated by the arrows a and b, respectively, and is gyroscopically stabilized for scanning scenes.

The coaxial wideband refractive optical system 10 has an objective (front) lens 18 for receiving the spectral range [0.5 micron wavelength (visible) to 12 microns wavelength (IR)] of energy passing through the window 14. The objective lens 18 is constructed of a wideband transmitting material whose physical and optical properties are suitable for high performance optical resolution and compatible with the sensor wavelength of the operation. Thus, for example, from the visible spectrum to 12 microns in the infrared zinc sulfide (ZnS) is used, from the partial visible spectrum to 12 microns zinc selenide is used, and from near IR to 12 microns Gallium Arsenide (GaAs) or Germanium (Ge) or TI=1173 glass manufactured by Texas Instruments Incorporated is used. For the visible to IR spectrum, preferably the material used is either the Zinc Sulfide material sold by the Raytheon Corporation under the trademark WATER WHITE ZINC SULFIDE or that manufactured by CVD Inc. and sold under the trademark CLEAR TRAN.

Applicants observed that the classical approaches included either a beamsplitter positioned in front of the first lenses of the IR and visible energy optical paths or a large IR energy lens with a center aperture for the passage of visible energy (the common aperture system). Neither of these systems had severe color aberrations but were large systems. During efforts to reduce the size of the common aperture system, applicants discovered that by using a material (ZnS, for example) operative from the visible wavelength (center at 0.5 micron) to the 12 micron wavelength (IR) as the front lens of the optical path and a beamsplitter to separate the visible and IR energy the size of the optical elements in the visible and IR optical paths could be substantially reduced but color aberrations were introduced. The color aberrations were corrected by singlet lenses but spherical aberrations were introduced. Thus, a doublet lens was used. Where the front lens is a positive lens the doublet lens includes a negative lens for correcting the color aberrations of the front lens and a positive lens which acts with the other lenses of the optical paths to correct the spherical aberrations.

A dichroic beam splitter 20 divides the optical path from the objective lens 18 into an infrared (IR) optic path and a visible optic path.

The IR optic path includes the common front lens 18, the negative ZnS 22, positive germanium lens 24 and folding mirrors 26 and 28 for producing a primary image focal plane at R. An eyepiece lens 30 is positioned behind the focal plane R for collimating IR energy onto an optical derotator 32 and IR scanner 34. The IR imager detector and cooler 36 are not shown in detail. The array of detectors 36 produce electrical signals proportional to the intensity of the impinging IR energy. The electrical signals are amplified in preamplifiers 38 and connected to a corresponding array of light emitting diodes 40 which produce a visible image thereof. The visible image is connected to an image intensifier tube 42 for biocular viewing.

The visible optic path includes the common ZnS front lens 18 and a doublet lens 44. A right angle prism 46 is positioned behind the doublet lens 44 for directing the visible energy through additional lens elements 48, 50 and 52 for transmitting the visible light down an optic tube (not shown) and focusing the visible light. Lens 52 is a doublet lens. A field lens 54 is located at the image plane of the visible system for changing the location of the pupil without changing the power of the system. Behind the field lens 54, a reflecting mirror 56 is provided for reflecting the visible image through a reimaging lens system consisting of lenses 58, 62 and 66 to relay the image to the eyepiece 68 for viewing. A Pechan prism 60 is positioned between lenses 58 and 62 in the reimaging lens system for image derotation. Reflecting mirrors 70, 72 are for reflecting the image to the monocular eyepiece 68. It will be appreciated that, for convenience, the IR biocular may be positioned in the monocular tube, parallel to the visible optics path. The infrared sensor video may be transferred to other convenient locations, by electronic reformatting light pipes, or fiber image guides. It will be noted by one skilled in the art that a transmitter such as, for example, a laser can be integrated into either channel.

The visible channel can be designed to incorporate other sensor detectors such as vidicons and CCD imagers. The high resolution visible telescope image may be relayed to remote locations by optical relays (light pipes) or by fiber optics image guides.

Although a preferred embodiment of the present invention has been described in detail, it is understood that various changes, substitutions and alterations can be made therein without departing from the scope of the invention as defined by the appended claims.

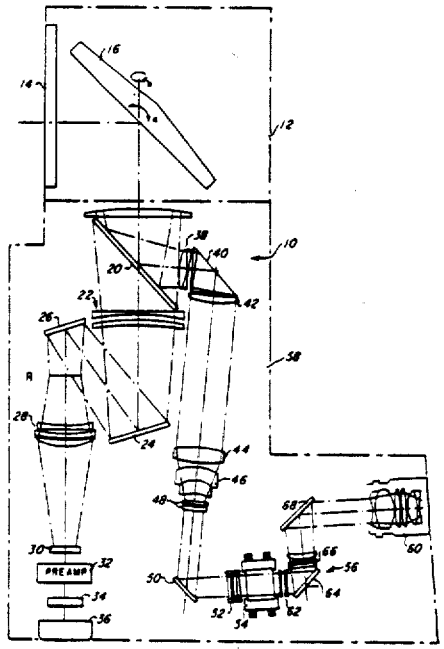

What is claimed is:

1. A coaxial, wideband, refractive, optical system comprising: an optical path having a front, solid, wideband, objective lens for receiving incoming electromagnetic energy radiating at about 0.5 micron in the visible to about 12 microns wavelength in the infrared and for reducing the diameter of the energy beam; a beamsplitter positioned in the optical path after the front objective lens for dividing the incoming energy into two paths; and color aberration correction lenses in said two optical paths for color aberration correction, said color aberration correction lenses comprising lens doublets; wherein the front, solid, wideband, objective lens is a positive lens and the doublet lenses include negative lenses and positive lenses, whereby the color dispersion of the front, solid, wideband, objective lens is corrected by the negative lenses of the doublets and the spherical aberrations are corrected by the positive lenses of the doublets acting in conjunction with the other lenses in the optical path.

2. A coaxial, wideband, refractive, optical system according to claim 1 wherein the negative lenses are of the same optical material as the front objective lens.

3. A coaxial, wideband, refractive, optical system according to claim (6) 2 wherein the front objective lens is of a material selected from the group consisting of Zinc Sulfide, Gallium Arsenide, TI-1173 glass and Germanium.

4. A coaxial wideband refractive optical system comprising: a front objective lens for reducing substantially the size of the following optical components; a beamsplitter, positioned after the front objective lens, which divides the incoming energy into two optical paths; and color aberration correction lenses in each of the two optical paths for color aberration correction of electromagnetic energy wavelengths from the visible electromagnetic radiation band centered at about 0.5 micron to about 12 microns wavelength in the infrared, wherein said color aberration correction lenses comprise lens doublets; wherein the front objective lens is a positive lens and the doublet lenses each include a negative lens and positive lens whereby the color dispersion of the front objective lens is corrected by the negative lens of the doublets, and the positive lens of the doublets together with the other lenses in the optical path correct spherical aberrations.

5. A coaxial wideband refractive optical system according to claim 4 wherein the negative lenses are of the same optical material as the front objective lens.

* * * * *

UNITED STATES PATENT AND TRADEMARK OFFICE
CERTIFICATE OF CORRECTION

PATENT NO. : 4,621,888

DATED : November 11, 1986

INVENTOR(S) : Robert E. Crossland et al.

Page 1 of 3

It is certified that error appears in the above-identified patent and that said Letters Patent is hereby corrected as shown below:

The Title Page should be deleted to appear as per attached title page.

Fig. 1 should appear as shown on the attached sheet.

Signed and Sealed this

Fifteenth Day of September, 1987

Attest:

DONALD J. QUIGG

*Attesting Officer*      *Commissioner of Patents and Trademarks*

United States Patent [19]

Crossland et al.

[11] Patent Number: 4,621,888
[45] Date of Patent: Nov. 11, 1986

[54] COAXIAL WIDEBAND REFRACTIVE OPTICAL SYSTEM

[75] Inventors: Robert E. Crossland, Plano; Erwin E. Cooper, Carrollton, both of Tex.

[73] Assignee: Texas Instruments Incorporated, Dallas, Tex.

[21] Appl. No.: 473,891

[22] Filed: Mar. 10, 1983

[51] Int. Cl.$^4$ .............................................. G02B 13/14
[52] U.S. Cl. ..................................... 350/1.2; 350/1.4; 350/541
[58] Field of Search ................. 350/1.2, 511, 541, 557, 350/173, 169, 538, 1.3, 1.4; 250/339, 342, 349

[56] References Cited

U.S. PATENT DOCUMENTS

| | | | |
|---|---|---|---|
| 4,038,547 | 7/1977 | Hoesterey | 350/1.3 |
| 4,074,930 | 2/1978 | Folsom et al. | 350/173 |
| 4,260,217 | 4/1961 | Traeger et al. | 350/538 |

Primary Examiner—Bruce Y. Arnold
Attorney, Agent, or Firm—Alva H. Bandy; James T. Comfort; Melvin Sharp

[57] ABSTRACT

A coaxial wideband refractive optical system is disclosed which permits the use of high resolution optical sensors and transmitters in the visible energy wavelengths centered at 0.5 microns to the 12 microns wavelength in the infrared energy band. The system includes a front objective lens of wideband transmitting material such as, for example, ZnS, ZnSe, GaAs, TI-1173 glass or Ge followed by a beamsplitter and two doublet lenses. The front objective lens, which may be a positive lens, can have large color dispersion characteristics (aberrations) not normally associated with front lenses. A front, solid wideband objective lens is provided for receiving incoming electromagnetic energy radiating at about 0.5 micron to about 12 microns wavelength in the infrared for reducing the size of the beam diameter; thus, the size of the beamsplitter and the elements of the infrared and visible optical paths formed by the beam splitter may be reduced. Each optical path formed by the beamsplitter includes one of the two lens doublets, each of which includes a negative lens of material like that of the front lens for correcting color aberrations and a positive lens which coacts with the remaining optical elements of the optical paths for correcting spherical aberrations introduced by the doublet's negative lens.

5 Claims, 1 Drawing Figure